Jan. 22, 1957     W. F. ZIMMERMANN     2,778,074
MACHINE FOR MAKING SHELL MOLDS
Filed July 22, 1954     6 Sheets-Sheet 1

FIG. 1.

INVENTOR
WILLIAM F. ZIMMERMANN
BY
ATTORNEY

Jan. 22, 1957  W. F. ZIMMERMANN  2,778,074
MACHINE FOR MAKING SHELL MOLDS
Filed July 22, 1954  6 Sheets-Sheet 3

FIG.5.

INVENTOR
WILLIAM F. ZIMMERMANN

ATTORNEY

Jan. 22, 1957   W. F. ZIMMERMANN   2,778,074
MACHINE FOR MAKING SHELL MOLDS
Filed July 22, 1954   6 Sheets-Sheet 4

INVENTOR
WILLIAM F. ZIMMERMANN

ATTORNEY

FIG.9.

INVENTOR
WILLIAM F. ZIMMERMANN

ATTORNEY

FIG.10.

United States Patent Office 2,778,074
Patented Jan. 22, 1957

2,778,074

MACHINE FOR MAKING SHELL MOLDS

William F. Zimmermann, Union, N. J., assignor to Shell-O-Matic, Inc., Newark, N. J., a corporation of New Jersey Application July 22, 1954, Serial No. 445,021

28 Claims. (Cl. 22—20)

This invention relates to a machine for making shell molds.

It is an object of the present invention to provide a machine in which the pattern box, with a pattern thereon, is automatically swung on the hopper from its initial position, then through the investment cycle, and then through the curing cycle and so that the cured mold is made ready for lifting off the pattern.

It is also an object of this invention to provide a machine in which the pattern box is automatically swung from its initial position of rest on the frame of the machine on to the hopper, then through the investment cycle, and returned to its initial position of rest on the frame of the machine.

It is also an object of this invention to provide a shell molding machine in which the pattern box contains a stripper plate floatingly mounted on spring means attached to the stripper plate and to the bottom of the pattern box.

It is also an object of this invention to provide a shell molding machine in which the pattern box contains a stripper plate floatingly mounted on spring means attached to the stripper plate and to the bottom of the box, and with a locking bar arranged to lock the stripper plate to the box when the pattern box is in an inverted position.

It is also an object of this invention to provide a shell molding machine in which an electrically heated oven is arranged to automatically move over the invested pattern on the pattern box to cure the mold, and to automatically become retracted back to its initial position at the end of a predetermined period of time.

It is also an object of this invention to provide a shell molding machine in which an electrically heated oven is arranged to automatically move over the invested pattern to cure the mold and with means to automatically open and close the door of the oven as it moves in relation to the mold on the pattern box.

It is also an object of this invention to provide a shell molding machine with an electrically heated oven movable over the mold on the pattern box to cure the mold and with means in the oven for adjustably positioning the heater strips in the oven over the mold to be cured.

It is also an object of this invention to provide a shell molding machine with improved means for actuating the stripper plate to remove the cured mold off the pattern box.

It is also an object of this invention to provide a shell molding machine with means arranged to automatically move the pattern box through the investment cycle and through the curing cycle and with means to automatically lock the control means against accidental manipulation by the operator.

Other and further objects of the present invention will appear hereinafter in the specification and drawings, and, in the drawings.

Figure 1:
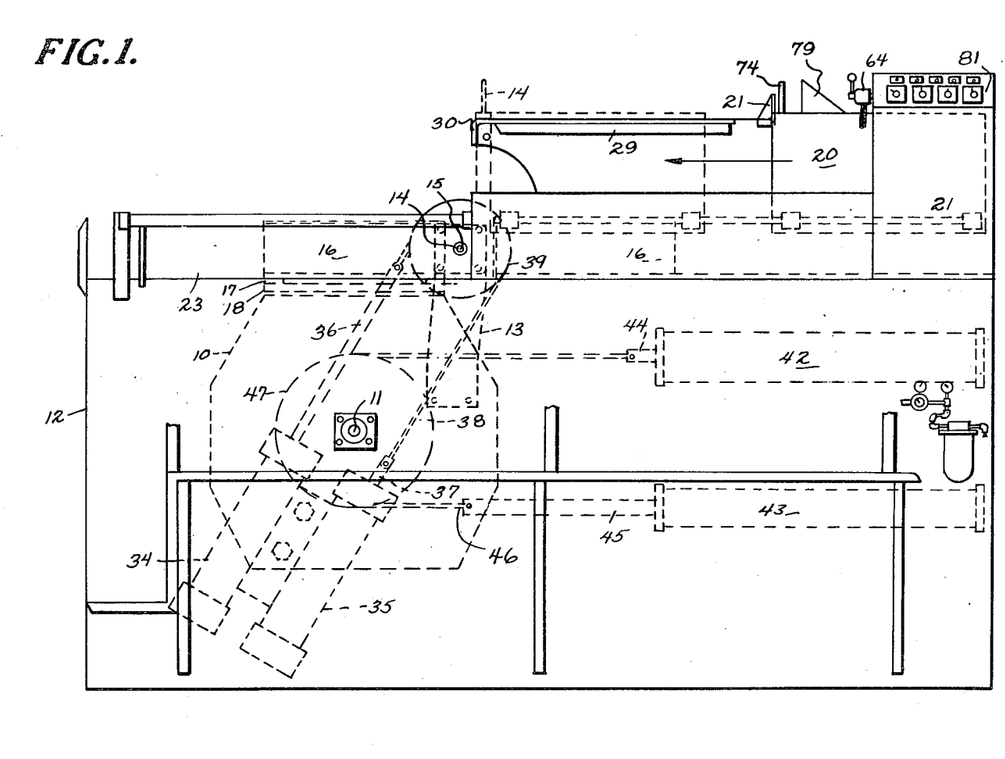
Figure 1 is a side elevational view of an embodiment of the invention.

As is shown in Figure 1, a hopper 10, which contains a mixture of sand and a resin, is pivotally mounted at the front end of the machine through stub shafts in bearings 11, on the frame 12 of the machine. Two arms 13, are secured to the opposite sides of the hopper, and they carry bearings 14, in which a shaft 15, is revolvable, and a pattern box 16, is secured to the shaft and is thereby hinged on the hopper. The pattern box is formed as a tray 17, with a removable plate 18, secured thereto by screws to form the top closure member of the tray, and a pattern 19, is secured to the plate on its upper surface. When the pattern box 16, is in its initial position it is seated on inwardly directed side plates of the frame 12. The Figure 1 shows the pattern box in its initial position, at the right, and also in its revolved position on the mouth of the hopper 10, at the left.

The pattern box is adapted to be revolved from its initial position on to the mouth of the hopper, then the hopper and the pattern box are, together, revolved so that the mixture may descend to cover the pattern for the investing of the pattern, next, the hopper and the pattern are returned to the position shown at the left end of Figure 1, and then the pattern box is swung over to the position shown at the right of the figure to its initial position.

Figure 2:
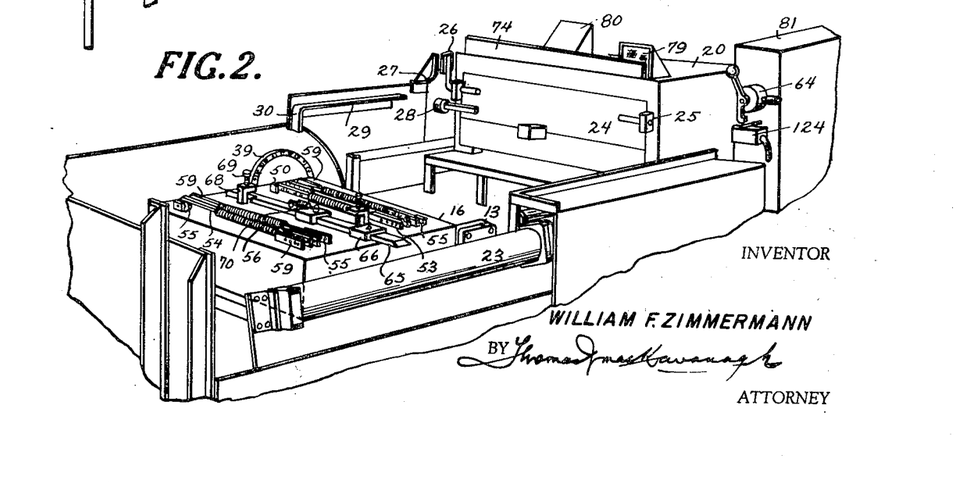
Figure 2 is a fragmentary perspective view of the machine from the top to show the mechanism on the bottom of the pattern box.
Figure 3:
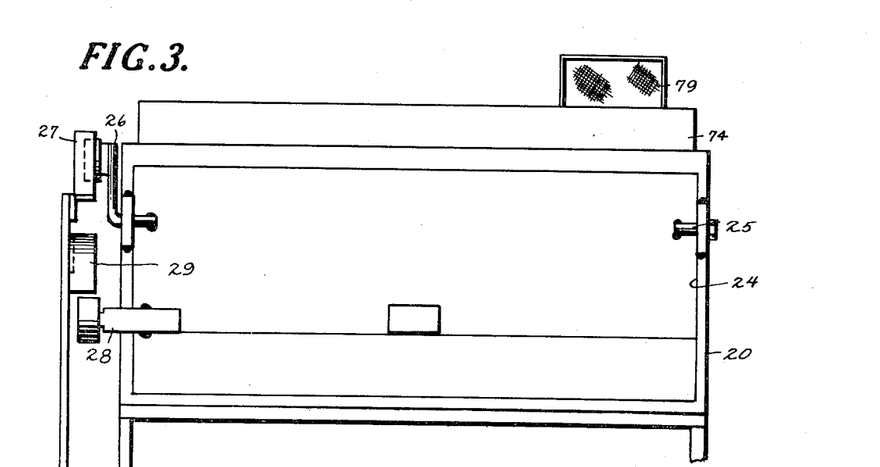
Figure 3 is a front elevational view of the oven.
Figure 4:
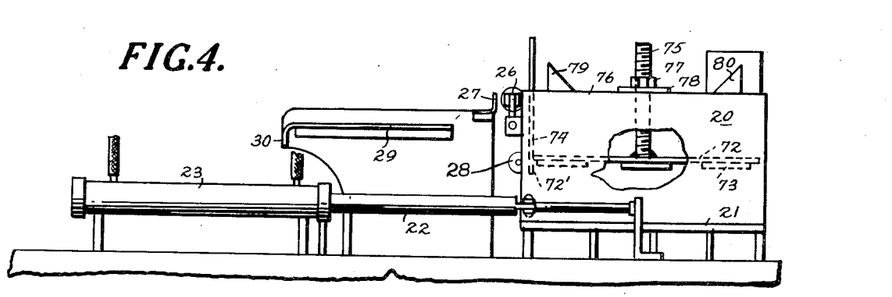
Figure 4 is a side elevational view of a part of the machine to show the oven, and with parts broken.
Figure 5:
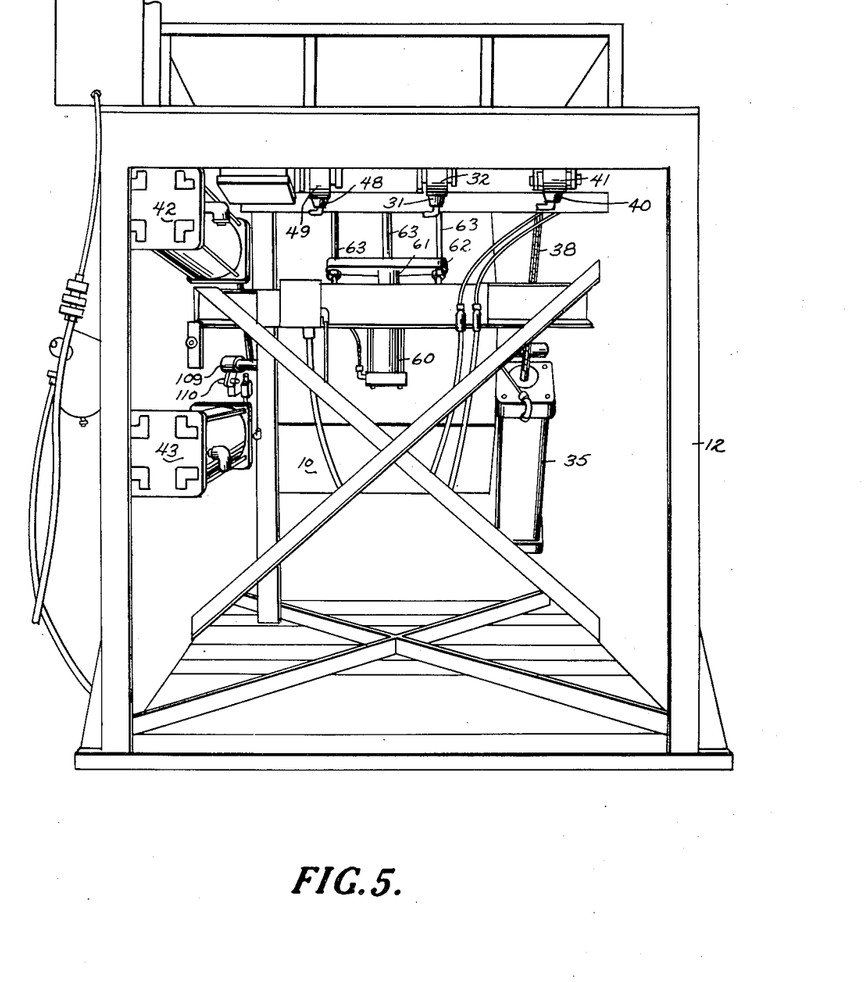
Figure 5 is a view in perspective of the rear end of the machine.

An electrically heated oven 20, is mounted on rails 21, at the rear end of the frame 12, and it is reciprocated by a piston rod 22, attached to the oven and reciprocable in an air cylinder 23, disposed at the front end of the frame. As is best shown in Figures 2, 3 and 4, a door 24, is hinged at 25, on the front of the oven, and one of its hinge pins 26, extends upwardly as a bent arm and carries a roller which engages a curved abutment member 27, on a side of the frame 12 to open the door as the oven begins to move forward over the pattern box 16.

As the pin 26 moves along the underside of the curved member 27, it has lifted the door so that a roller on the end of a rod 28, on the door 24, is lifted to engage a rail 29 to hold the door open, and the rod 28 rides on the rail as the oven advances until the oven is directly over the pattern box 16, and at which time the rod drops down over the curved end 30 of the rail to close the door. As the oven is being pushed back to the rear end of the machine the rod 28 rides up the curved end 30, and holds the door open until it reaches the rear end of the rail 29, and when the member 26 comes in contact again with the abutment member 27, and finally slides up the vertical face of the member 27, to close the door.

The cylinder 23 is fed with air under pressure at both ends through a conventional solenoid actuated valve 31, having a solenoid 32. When the solenoid is energized the valve moves to admit air to the cylinder 23, to move the oven forward, and when the solenoid becomes de-energized a spring moves the valve to admit air to the opposite end of the cylinder to move the oven to the rear. The valve is conventional, and no claims are made to its structure. To avoid a confusion of lines the air pipes to the cylinder are not shown, and neither is the source of air.

A pair of air operated cylinders 34 and 35 are secured to a side of the hopper 10, and their piston rods 36 and 37 are connected to a chain 38, which rides on a sprocket wheel 39, secured to the shaft 15, to rotate the pattern box 16. Air is admitted to the top end of each cylinder through flexible tubes connected to a conventional solenoid operated valve 40, having a solenoid 41. When the solenoid is energized the valve is moved to admit air to one of the cylinders, and when it becomes de-energized a spring moves the valve to admit air to the other cylinder. The solenoid operated valve is conventional and no claims are made to its structure.

Mounted on the frame of the machine, and at the rear end of the frame are a pair of air operated cylinders 42 and 43, and which have piston rods 44 and 45, connected to a chain 46, which rides on a sprocket 47, on a stub shaft of the hopper 10, to rotate the hopper. Air is admitted to one end of each cylinder through a solenoid operated valve 48, having a solenoid 49, and when the solenoid is energized air is admitted to one cylinder, and when the solenoid becomes de-energized a spring shifts the valve to admit air to the other cylinder. The solenoid operated valve is conventional, and no claims are made to its structure.

Figure 6:
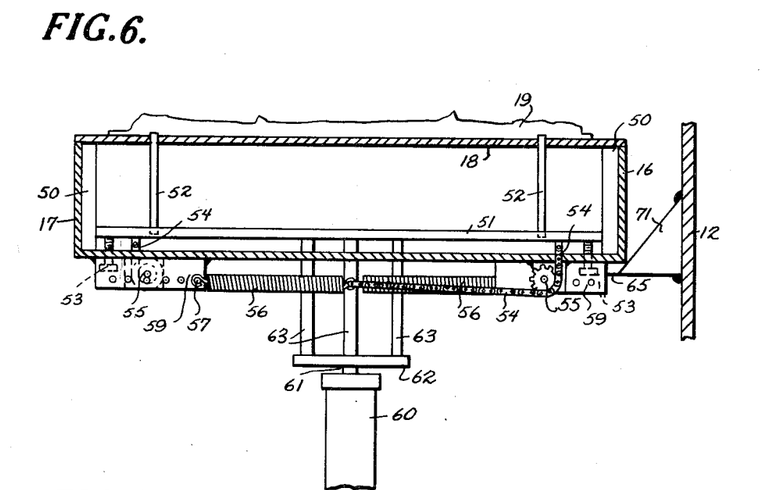
Figure 6 is a sectional view through the pattern box to illustrate the stripper plate control means.
Figures 7, 8:
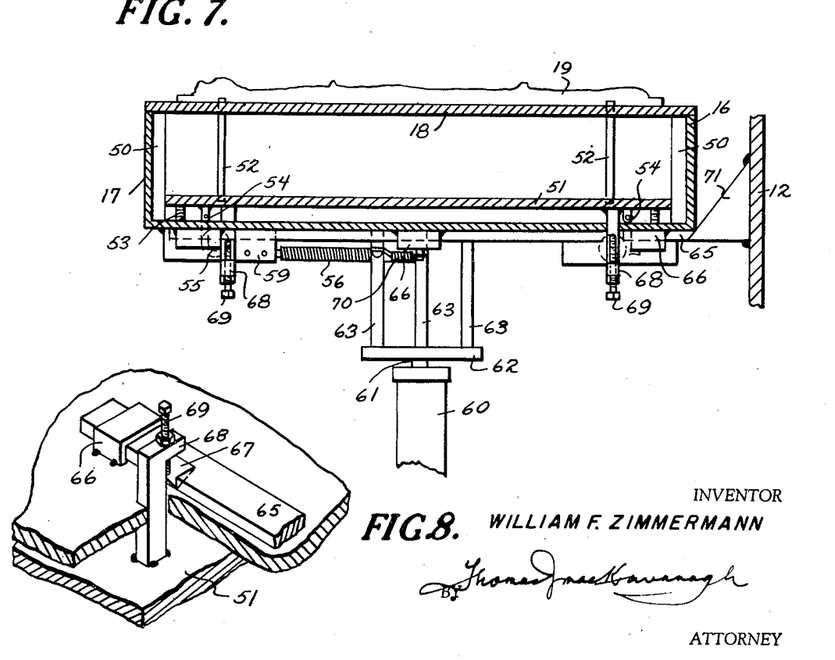
Figure 7 is an additional sectional view through the pattern box for the further illustration of the stripper plate control means.
Figure 8 is an inverted detail view, with parts broken, to illustrate a part of the locking bar mechanism.

As is best shown in Figures 6 to 8, the pattern box 16 is provided with internal strip electric heaters 50, which engage the pattern plate 18, and the pattern plate is maintained heated at all times during the operation of the machine. A stripper plate 51 is within the tray 17, and it carries a plurality of stripper pins 52, which are adapted to move through holes in the pattern plate to lift a cured mold off the plate. Adjusting screws 53 on the bottom of the pattern box are adjusted to position the stripper plate so that the upper ends of the stripper pins project slightly above the upper surface of the pattern plate when they are in their normal and un-actuated position.

The stripper plate 51 is connected at each of its four corners to chains 54, which ride on small sprockets 55 mounted on the bottom of the pattern box, and the chains are connected to springs 56, which are adjustably connected at their free ends to guide plates 59 on the bottom of the pattern box through pins 57, entered through the springs and into spaced holes in the guide or anchoring plates 59. The stripper plate is normally held sitting on the adjusting screws 53 by the tension of the springs 56, when the stripper plate is in its un-actuated condition.

An air operated cylinder 60, on the frame of the machine, has a piston 61, which carries a triangular plate 62, on which there are three adjustably mounted ejector pins 63, adapted to pass through holes in the bottom of the pattern box to lift the stripper plate. Admission of air to the cylinder 60, is controlled by a manually operated valve 64, mounted on the frame at the rear of the frame. Suitable guide fingers, not shown, engage the plate 62 to prevent its turning.

When the pattern box 16 is turned to an inverted position over the mouth of the hopper 10, it is advisable to lock the stripper plate so that it cannot move substantially from its normal and un-actuated position. Locking means are provided in a locking bar 65, which slides in guide means 66, on the bottom of the pattern box, and the bar has an inclined or wedge shaped surface 67 as best shown in Figure 8, to engage the face of adjustable cam means 68, that extend from the stripper plate 51, through the bottom of the pattern box 16. The cams 68 are provided with adjustable screws 69 to engage the wedge surface 67 of the locking bar. The bar 65 is normally urged into locking relation with the cams 68, and therefore with the stripper plate 51, by a spring 70, connected to the bar and to one of the guide means 66. The face of the bar which engages the bottom of the pattern box is grooved and the grooves are filled with a silicone grease.

As the pattern box 16 is being turned from its inverted position over the hopper to its initial position of being seated on the frame of the machine, the locking bar 65, is moved to the unlocked position as it engages a cam 71 on the frame of the machine, so that the bar 65 is no longer in its locking position when the pattern box 16 reaches its initial position of rest on the frame of the machine and the cams 68, have moved off the inclined or wedge surface of the bar 65.

Referring now to Figure 4, the oven 20 has an internal horizontal plate 72, which carries strip electric heaters 73 on its lower face. The plate 72 is welded to a vertical plate 74 which rides in guides, not shown, in the front of the oven. The plate 74 extends a short distance below the front end of the plate 72 at 72', to protect the strip heaters against contact with the mold on the pattern plate 18, should the plate 72 be inadvertently too low. A screw jack 75, is secured to the plate 72, and extends through the top 76 of the oven, and is adjustably positioned by a nut 77, riding on washers 78, on the top of the oven. The vertical plate 74, forms a front closure for the pocket defined between the upper face of the plate 72 and the top of the oven, and so prevents the escape of heat from that pocket when the oven is moving with its door 24 in its open position.

The screw jack 75 admits of the plate 72 and its strip heaters 73, being adjustably positioned over the mold on the pattern plate 18 during the curing of the mold by the oven so that the mold will not become distorted by too fast curing. It also admits of the spacing between the strip heaters and the mold, being adjusted to the depth of the mold on the pattern plate. Control of the curing rate can, of course, be effected by controlling the current to the strip heaters, but, in practice, it is much simpler and more practical to adjust the spacing between the mold and the heaters for a given current in the heaters, by means of the screw jack.

On top of the oven 20 there are two ventilators 79 and 80, which are oppositely directed, and which communicate through the top of the oven with the pocket above the plate 72 to carry off vapors given off by the curing mold. This ventilation of the pocket also makes for longer life of the asbestos covered wires connected to the strip heaters and of their connections with the heaters. Being oppositely directed they take advantage of the draft of air through them as the oven is being reciprocated. The walls of the oven are suitably insulated by insulating means, not shown.

A control box 81, is fitted on the frame at the rear end of the machine and it contains the necessary switches, timers, relays, and current control means for the operation of the machine.

Figure 9:
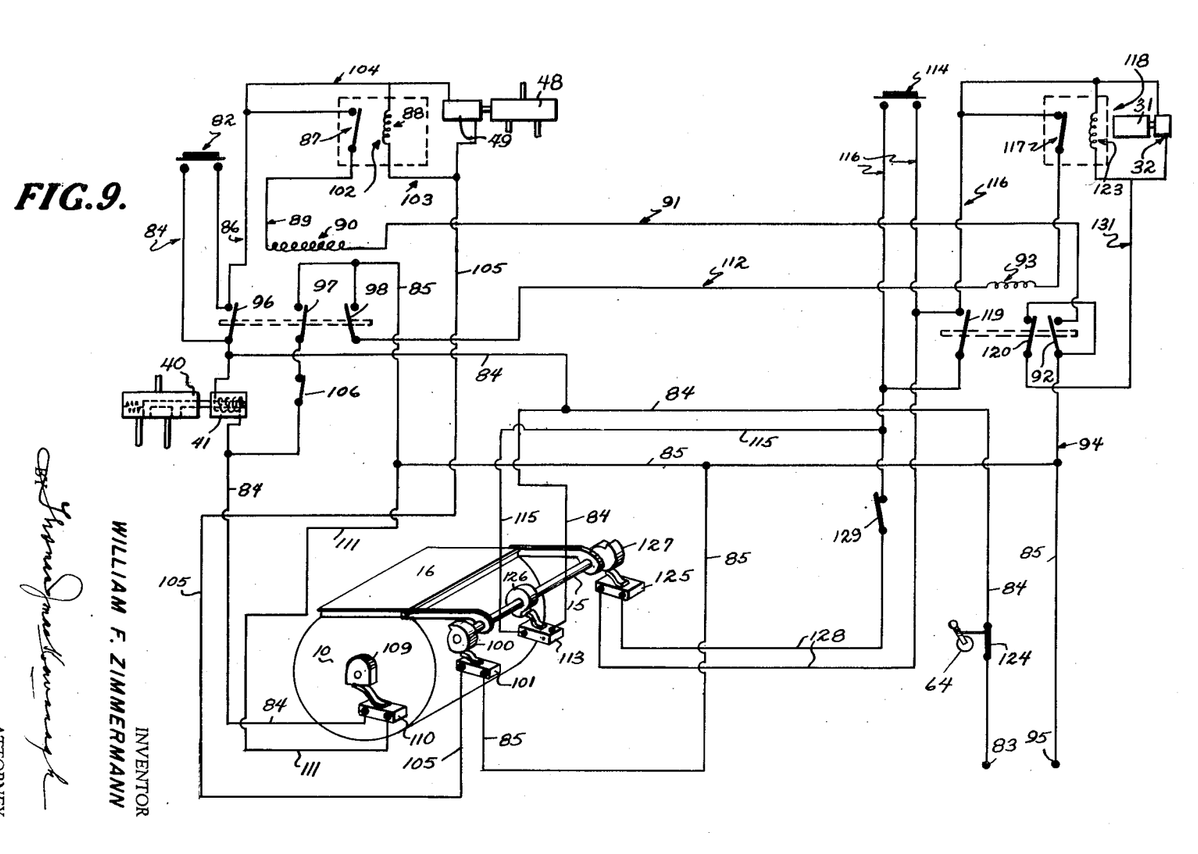
Figure 9 is a wiring diagram of the electrical control means.

With reference now to Figure 9, and a description of the operation of the machine: Assuming that the pattern box 16, with its pattern 19 thereon is in its initial position on the frame of the machine, and that the pattern box has been brought to the proper operating temperature, the operator momentarily presses the Investment Start button 82, to cause current to flow from one terminal 83, of a source of power, along a wire 84, along a wire 86, through a closed switch 87, of a conventional timer 88, along a wire 89 through the operating coil of an electromagnetic switch 90, then by a wire 91, and through a switch 92 of an electromagnetic switch 93, and then back by wire 94 to the other terminal 95 of the source of power. This results in the energization of the switch 90 to cause it to close its switches 96 and 97, and to open switch 98. Current now flows from the wire 84, through the solenoid 41 of the pattern box operating valve 40 through switch 97, and back to the other side of the source through a wire 85, and the pattern box turns over and becomes seated on the mouth of the hopper.

Although the system is adapted for use on alternating current, it will be convenient to think of wire 84 as the incoming wire and of 85 as the return wire of the power circuit.

The timer 88 is of conventional construction, is driven by a synchronous motor and is spring reset, and no claims are made to its structure.

As the pattern box 16, goes down over the mouth of the hopper 10, a cam 100 on the shaft 15 engages a switch 101 mounted on the hopper to close this switch and cause current to flow from wire 84, through switch 96, along wires 86 and 104, through solenoid 49 of the hopper control valve 48, along wire 105, and through the cam operated switch 101, and back to the other side of the power source by wire 85. At the same time it closes the circuit of an operating coil 102 in parallel with the solenoid 49 through wires 104 and 103 to start the timer 88.

The hopper 10 now becomes inverted and carries with it the pattern box 16, and its pattern 19, and while the hopper is inverted the air is maintained on the turning cylinder of the pattern box so that the pattern box is held against the mouth of the hopper.

Should the main power supply become interrupted while the hopper is inverted, the de-energization of the solenoids would result in the valves moving to their spring-actuated position and the hopper and the pattern box would return to their initial positions. To guard against excessive loss of the mixture in such an accidental condition, means are provided to hold the pattern box to the hopper while it is inverted, and such means may take the simple form of a hook on the hopper engaging a pin on the pattern plate. Such means are provided but not shown.

The timer 88 is set to hold its switch 87 closed for the few seconds necessary for the mixture in the hopper to invest the heated pattern on the pattern plate, and then the switch 87 is opened by the timer. The opening of switch 87 results in the deenergization of the electromagnetic switch 90, and the consequent opening of its switches 96 and 97, and the closing of switch 98. This will result in the de-energization of the solenoid 49 of the hopper valve and the spring-actuation of this valve to return the hopper to its initial position. It would also result in the de-energization of the solenoid 41 of the pattern box valve, but this de-energization of the solenoid 41 is prevented by a closed switch 110 mounted on the frame of the machine and actuated by a cam 109 on the hopper, and held closed by the cam until the hopper has substantially reached its initial position. When the hopper has reached its initial position the switch 110 opens, the solenoid 41 becomes de-energized, and the spring-actuated valve 40 returns the pattern box 16 to its initial position on the frame of the machine. The circuit comprises wire 84, solenoid 41, switch 110, and wire 111, back to wire 85.

While the electromagnetic switch 90 is energized the opening of its switch 98 opens the circuit of the electromagnetic switch 93, connected to it by wire 112, so that it is impossible to actuate switch 93 while switch 90 is energized. Further, a switch 113 on the frame of the machine is normally held open by a cam 126, on the shaft 15, while the pattern box 16 is substantially away from its initial position to open the power circuit which comprises the wire 84, the switch 113, and wire 115. The switch 113 is arranged to close when the pattern box 16 is several inches from its position of rest in its initial position to close the circuit ahead of another switch to be described later, and so as not to be too sensitive to movements of the pattern box when the operator manually lifts the pattern box for any reason.

It will now be apparent that from the initial momentary pressing of the Investment Start button the operation of the machine is entirely automatic through the investment cycle, and the return of the pattern box to its initial position with the invested pattern upon it.

When the invested pattern comes to rest on the frame of the machine, and it is considered by the operator as in proper condition for curing, the operator now momentarily presses the Cure Start button 114. Current now flows from the incoming power line 84, through the switch 113, along wire 115, through the button switch 114, through the closed switch 117 of a timer 118, through the operating coil of the electromagnetic switch 93, along wire 112, to the closed switch 98, of the electromagnetic switch 90, and then back by wire 85 to the source of power. When the operating coil of the electromagnetic switch 93 becomes energized, it moves its switches 119 and 120 to the closed position and opens its switch 92. The switch 119 closes a holding circuit for the switch 114 just as switch 96 closes a holding circuit for the button switch 82.

Current also flows along the wires 116 through the solenoid 32 of the oven control valve 31, along wire 131, through switch 120, and back by wires 94 and 85 to the other side of the power source, and the oven is moved over the invested pattern. At the same time, the operating coil 123 of the timer 118 is energized to start the timing cycle for it is in parallel with the solenoid 32. At the end of a predetermined period of time, the timer 118 opens the switch 117 to de-energize the electromagnetic switch 93, and this results in the opening of the circuit of the solenoid 32, of the valve 31, and the now spring actuated valve causes the return of the oven to the rear of the machine.

The opening of switch 92 of the electromagnetic switch 93 interrupts the circuit of the operating coil of the electromagnetic switch 90, so that an accidental closing of the Investment Start button switch 82 has no effect.

The next operating step is the lifting of the cured mold off the pattern plate. The manually operable valve 64 is now moved to admit air to the cylinder 60 to lift the stripper plate 51 to cause its pins 52 to lift the cured mold. As the valve 64 is being moved to its open position, a switch 124 is also moved to the open position through an operative connection with the valve 64, and it opens the power line 84 so that all of the control circuits are dead.

When the molding machine is used to produce repetitive molds from the same pattern, it is desirable to have the machine go automatically through the investment cycle and through the curing cycle without stopping for inspection of the mold at the end of the investment cycle. This automatic operation is accomplished by a switch 125, on the frame 12, and operated by a cam 127, on the shaft 15, and with the cam timed to momentarily close a circuit including the switch 125, and connecting wires 128 which connect the switch 125 in parallel with the Cure Start button switch 114.

The switch 125 is a microswitch and it closes when the switch operating arm is raised. A manually operable switch 129 is connected in series with it so that the switch 125 may be made ineffective when its function is not desired by simply opening the switch 129.

The cams 100, 126 and 127 are mounted adjustably on the shaft 15 so that they may be adjusted independently of each other to get the desired timing.

A normally closed switch 106 is connected in series with the switch 97, and it may be manually opened when adjustments are being made.

The showing of the valve 40 is merely diagrammatic for ease in illustrating for the valve actually used is of relatively flat plates difficult to illustrate. The valves 48 and 31 are similar in function to that of valve 40.

Figure 10:
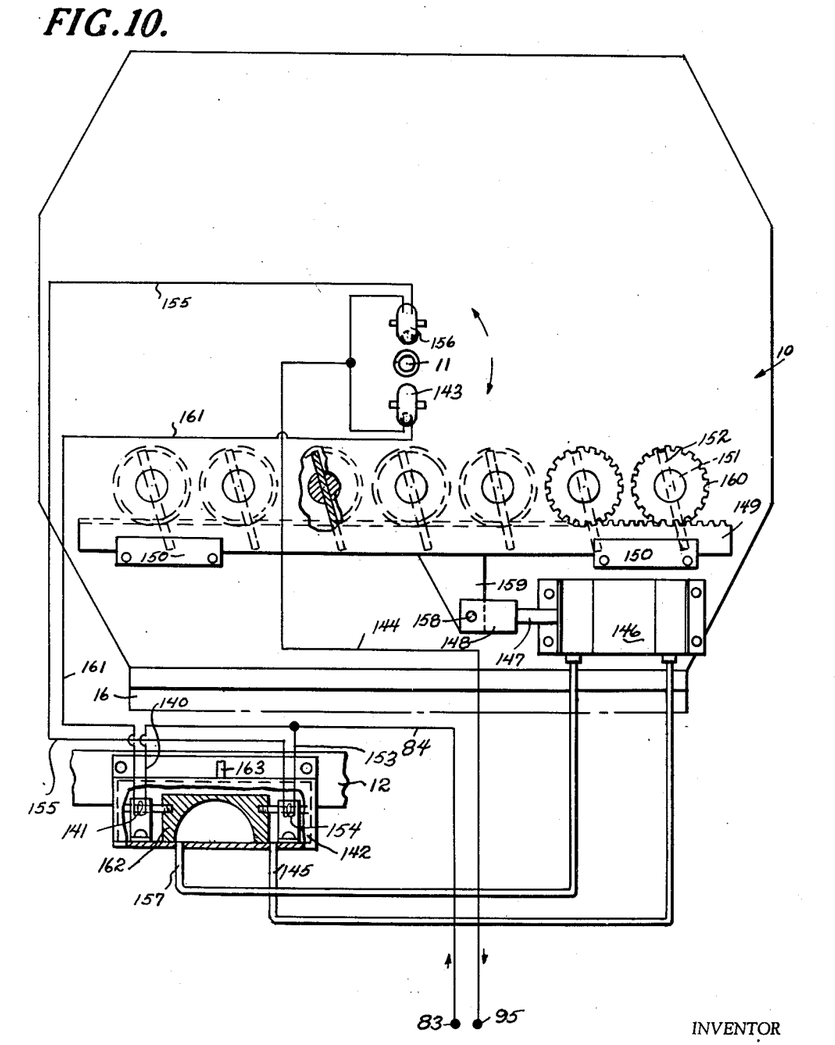
Figure 10 is a side elevational view of the inverted hopper with parts broken and parts in section.

In some types of work in which the machine is used, and particularly when the pattern is large or when a heavy investment is desired, it has been found advantageous to modify the machine, as shown in Figure 10, by the addition of louvres which are opened when the hopper 10 is inverted and which are held open until the hopper returns to its normal vertical position to permit the loose investment material to drop back into the hopper. In Figure 10 the hopper is shown in its inverted position with the louvres open.

An air cylinder 146 on the hopper 10 has a piston 147 connected through a connecting member 148 and through a pin 158 to a clevis 159, connected to a toothed bar 149, which slides in guides 150, and engages the teeth of gear wheels 160, connected through an axle 151, to which the louvres 152 are connected. The axles extend across the hopper opening and are suitably journalled in bearing means, not shown, on the remote inner face of the hopper. The air cylinder 146 has air admitted alternately to the front and rear ends through flexible pipes 145 and 157, respectively, and admission of air is controlled by a valve 142 mounted on the frame of the machine. The valve 142 is shown diagrammatically, and it comprises a valve member 162, which is reciprocated by a pair of solenoids 141 and 154 respectively. Solenoid 141 is energized by a mercury switch 143 mounted adjustably on the hopper 10, and current flows over the incoming power line 84, through a wire 140, through the solenoid 141, through a wire 161, through the switch 143, and back by a wire 144 to the other terminal 95 of the power source.

Solenoid 154 is energized by a mercury switch 156 mounted adjustably on the hopper 10, and current flows through the incoming power wire 84, through a wire 153, through the solenoid 154, through a wire 155, through the switch 156, and back to terminal 95, of the other side of the power source by the wire 144.

The switch 143 is closed by the globule of mercury closing its contacts when the hopper is inverted, and when the hopper is upright the globule leaves the contacts, and another globule of mercury closes the contacts of the switch 156.

The valve member 162 moves to the left when solenoid 141 is energized to admit air from an incoming air line 163 to pass through the flexible pipe 145, and moves to the right when solenoid 154 is energized to permit air from pipe 145 to exhaust and to admit air to pipe 157. The exhaust outlet is not shown.

It will be noted in Fig. 10 that the axle 151, is off-centre with respect to the mid-line of the louvre 152. In one machine, the short arm of the louvre is one and a half inches long while the long arm is two and a half inches long. The axles are spaced apart so that when the louvres are closed the long arm of one louvre underlies the short arm of the adjacent louvre.

When the hopper is inverted and before the louvres have opened, it is evident that the weight of the mixture in the hopper is substantially balanced on the short arm of one louvre and on the exposed portion of the long arm of the adjacent louvre. When the louvres are opened, then as they open, the torque on the long arm predominates to assist in compelling the short arm to pass through the mixture.

It has been found that the power required to operate the louvres of the present invention is a great deal less than that required to operate louvres having the axle on the center of the blade and without overlapping of the blades.

I claim:

1. A shell molding machine comprising a frame, a hopper mounted rotatably on said frame, a pattern box mounted swingably on said hopper, power means connected to said hopper to rotate said hopper, switch means actuable by said pattern box, and circuit means connecting said switch means with said power means to effect rotation of said hopper.

2. A shell molding machine comprising a frame, a hopper mounted rotatably on said frame, a pattern box mounted on said hopper for swinging movement thereon, power means connected to said hopper to rotate said hopper, a first switch means actuable by said pattern box, circuit means connecting said first switch means with said power means to effect rotation of said hopper in one direction of movement, and timed switch means in said circuit means and operable to de-energize said circuit means at the end of a predetermined period of time.

3. A shell molding machine comprising a frame, a hopper mounted rotatably on said frame, a pattern box mounted on said hopper for swinging movement thereon, power means connected to said hopper to rotate said hopper, a first switch means actuable by said pattern box, circuit means connecting said first switch means with said power means to effect rotation of said hopper in one direction of movement, timed switch means in said circuit means and operable to de-energize said circuit means, and means connected with said power means and actuable upon the de-energization of said circuit means by said timed switch means to effect rotation of said hopper in an opposite direction of movement.

4. A shell molding machine comprising a frame, a hopper mounted rotatably on said frame, a pattern box mounted on said hopper for swinging movement thereon, a first power means connected to said pattern box to swing said pattern box, a first switch means, a first circuit means connecting said first switch means with said first power means, a second power means connected to said hopper, a second switch means actuable by said pattern box, and a second circuit means connected with said second switch means and with said second power means to effect rotation of said hopper in one direction of movement.

5. A shell molding machine comprising a frame, a hopper mounted rotatably on said frame, a pattern box mounted on said hopper for swinging movement thereon, a first power means connected to said pattern box to swing said pattern box, a first switch means, a first circuit means connecting said first switch means with said first power means, a second power means connected to said hopper, a second switch means actuable by said pattern box, a second circuit means connected with said second switch means and with said second power means to effect rotation of said hopper in one direction of movement, timed switch means in said second circuit means operable to de-energize said second circuit means, and means connected with said second power means actuable to effect rotation of said hopper in another direction of movement upon de-energization of said second circuit means by said timed switch means.

6. A shell molding machine comprising a frame, a hopper mounted rotatably on said frame, a pattern box mounted on said hopper for swinging movement thereon, a first power means connected to said pattern box to swing said pattern box from an initial position of rest on said frame to a position over the hopper, a first switch means, a first circuit means connecting said first switch means with said first power means, a second power means connected to said hopper, a second switch means actuable by said pattern box, a second circuit means connected with said second switch means and with said second power means to effect rotation of said hopper in one direction of movement to invert said hopper and said pattern box thereon, said first power means being effective to retain said pattern box against said hopper while said hopper is inverted.

7. A shell molding machine comprising a frame, a hopper mounted rotatably on said frame, a pattern box mounted on said hopper for swinging movement thereon, a first closed switch means, a first power means connected to said pattern box, a first circuit means connected to said first closed switch means and to said first power means for movement of said pattern box from an initial position on said frame and to a position over said hopper, a second power means connected to said hopper, a second switch means actuable by said pattern box, a second circuit means connected with said second switch means and with said second power means to effect rotation of said hopper and said pattern box thereon to an inverted position, timed switch means in said second circuit means to de-energize said second circuit means, means connected with said second power means actuable to effect rotation of said hopper in another direction of movement upon de-energization of said second circuit means by said timed switch means, and means to de-energize said first circuit means when said hopper returns to its initial position.

8. A shell molding machine comprising a frame, a hopper mounted rotatably on said frame, a pattern box mounted on said hopper for swinging movement thereon, a first power means connected to said pattern box to swing said pattern box from an initial position of rest on said frame to over said hopper, a first means movable to condition said first power means to swing said pattern box, a second power means connected to said hopper to rotate said hopper, and a second means actuable by said pattern box to condition said second power means to rotate said hopper.

9. A shell molding machine comprising a frame, a hopper mounted rotatably on said frame, a pattern box mounted on said hopper for swinging movement thereon, a first power means connected to said pattern box to swing said pattern box from an initial position of rest on said frame to a position over said hopper, a first means movable to condition said first power means to swing said pattern box, a second power means connected to said hopper to rotate said hopper, a second means actuable by said pattern box to condition said second power means to rotate said hopper with said pattern box thereon to an inverted position, timed means operable to condition said second power means to subsequently rotate said hopper back to its initial position, and means operable when said hopper has returned to its initial position to condition said first power means to swing said pattern box back to its initial position of rest on said frame.

10. A shell molding machine comprising a frame, a hopper mounted rotatably on said frame, a pattern box mounted on said hopper for swinging movement thereon, a first power means connected to said pattern box to swing said pattern box from an initial position of rest on said frame to over said hopper, a first means movable to condition said first power means to swing said pattern box over said hopper, a second power means connected to said hopper to rotate said hopper, a second means actuable by said pattern box to condition said second power means to rotate said hopper with said pattern box thereon to an inverted position, a first timed means operable to condition said second power means to subsequently rotate said hopper back to its initial position, means operable when said hopper has returned to its initial position to condition said first power means to swing said pattern box back to its initial position of rest on said frame, an oven, electric heater means in said oven, a third power means connected to said oven to reciprocate said oven, a third means actuable by said pattern box to condition said third power means to move said oven over said pattern box in its position of rest, and a second timed means actuable to condition said third power means to move said oven away from said pattern box.

11. A shell molding machine comprising a frame, a pattern box resting on said frame, an oven, electric heater means in said oven, power means connected to said oven to reciprocate said oven, means actuable by said pattern box to condition said power means to reciprocate said oven, a door hinged on said oven, means on said frame engageable by said door and operable to open said door while said oven is moving and to release said door for closing when said oven is at rest.

12. A shell molding machine comprising a frame, a pattern box resting on said frame, an oven, heater means in said oven, power means connected to said oven to move said oven over said pattern box to cure a mold on said pattern box and to move said oven to a retracted position, means actuable by said pattern box to condition said power means to move said oven to a position over said pattern box, and timed means actuable to condition said power means to restrict said oven.

13. A shell molding machine comprising a frame, a pattern box resting on said frame, an oven, heater means in said oven, means to move said oven from a retracted position to a position over said pattern box and then back to its retracted position, a door hinged on said oven, means on said frame engageable by said door to move said door to open position as said oven is in motion from its retracted position to its position over said pattern and while it is in motion in moving to its retracted position, and means to release said door to close when it is at rest over said pattern and when it is in its retracted position.

14. A shell molding machine comprising a frame, a pattern box resting on said frame, an oven, means to move said oven to a position over said pattern box, a horizontal plate in said oven, electric heater means on said plate, said oven having a top, means defining a pocket between said plate and the top of said oven, ventilator means on the top of said oven and in communication with said pocket, movable means defining a closure member for one side of said pocket and comprising a vertical plate secured to said horizontal plate and movable through the top of said oven at the front end of said oven.

15. A shell molding machine comprising a frame, a hopper mounted rotatably on said frame, a pattern box mounted on said hopper for swinging movement thereon, means to swing said pattern box from a position of rest on said frame to an inverted position over said hopper, a stripper plate in said pattern box, a locking bar slidable on the bottom of said pattern box, means on said stripper plate engageable with said bar to lock said stripper plate to said pattern box when said pattern box is inverted, and means on said frame engageable by said locking bar when said pattern box is in its position of rest on said frame to move said locking bar into unlocking relation to said stripper plate.

16. A shell molding machine comprising a frame, a hopper mounted rotatably on said frame, a pattern box mounted on said hopper for swinging movement thereon, means to swing said pattern box from a position of rest on said frame to an inverted position over said hopper, a stripper plate in said pattern box, means to lock said stripper plate to said pattern box when said pattern box is away from its initial position of rest on said frame, and means on said frame to engage said locking means to unlock said locking means when said pattern box is in its position of rest on said frame.

17. In a shell molding machine, a pattern box, a stripper plate in said pattern box, an ejector plate, three pins adjustably mounted on said ejector plate and disposed substantially 120 degrees apart, said pins being arranged to pass through the bottom of said pattern box to engage and lift said stripper plate, and means to lift said ejector plate.

18. A shell molding machine comprising a frame, a hopper mounted rotatably on said frame, a pattern box mounted on said hopper for swinging movement thereon, means to swing said pattern box from a position of rest on said frame to an inverted position over said hopper, means to rotate said hopper from an initial position with said pattern box thereon to an inverted position, louvres on said hopper, an air cylinder on said hopper connected to said louvres to actuate said louvres, a valve on said frame and having a pair of solenoids alternately energizable to control air to said cylinder, and switch means on said hopper connected to said solenoids for alternate energization of said solenoids.

19. A shell molding machine comprising a frame, a hopper mounted rotatably on said frame, a pattern box mounted on said hopper for swinging movement thereon, means to swing said pattern box from a position of rest on said frame to an inverted position over said hopper, means to rotate said hopper from an initial position with said pattern box thereon to an inverted position, louvres on said hopper, an air cylinder on said hopper to actuate said louvres, a valve on said frame and having a pair of solenoids alternately energizable to control air to said cylinder, and switch means actuable by said hopper connected to said solenoids for alternate energization of said solenoids.

20. A shell molding machine comprising a pattern box, a pattern on said pattern box, an electric oven, electrically controlled power means connected to said oven to reciprocate said oven, manualy operable switch means, switch means in circuit with said manually operable switch means and controllable by said pattern box and in circuit with said power means and effective to produce movement of said oven to a position over said pattern upon closing of said manually operable switch means, and timer means in circuit with said power means to subsequently effect retraction of said oven at the end of a predetermined period of time.

21. A shell molding machine comprising a frame, a hopper mounted rotatably on said frame, a pattern box swingably mounted on said hopper, a pattern on said pattern box, an oven, means to reciprocate said oven over said pattern, a door on said oven, a curved abutment member on said frame, a first arm on said door adapted to engage said abutment member to open said door as said oven advances over said pattern, a second arm on said door, a rail on said frame in spaced relation to said curved abutment member, said second arm being adapted to ride on said rail to hold said door open as said oven advances, said rail having a curved front end whereby said second arm drops to close said door when said oven is positioned enclosing said pattern.

22. A shell molding machine comprising a frame, a hopper turnable on said frame, a first power means on said frame connected to said hopper to turn said hopper, a first valve means including a first solenoid connected with said first power means to control said first power means, a shaft turnable on said hopper, a pattern box connected to said shaft and initially seated on said frame, a pattern on said pattern box, a second power means on said hopper and connected to said pattern box to rotate said pattern box, a second valve means including a second solenoid connected with said second power means to control said second power means, a first cam on said shaft, a first switch on said hopper engageable by said first cam, a second cam on said hopper, a second switch on said frame engageable by said second cam, timing means, means to energize said second solenoid to effect inversion of said pattern box with energization of said timing means and with energization of said first solenoid when said first cam engages said first switch to effect inversion of said hopper for a predetermined period of time, means including said first and said second valves to return said hopper and said pattern box to their initial positions at the end of the time period, and means including said second cam and said second switch to delay de-energization of said second solenoid until said hopper has practically returned to its initial position.

23. A shell molding machine comprising a hopper, a first power means connected to said hopper to rotate said hopper, a first valve means including a first solenoid to control said first power means, a pattern box, a pattern on said pattern box, a second power means connected to said pattern box to rotate said pattern box, a second valve means including a second solenoid to control said second power means, an oven, a third power a third valve means including a third solenoid to control said third power means, a first timing means, means to energize said second solenoid to effect turning of said means connected to said oven to reciprocate said oven, pattern box over on to said hopper, means actuable by said pattern box to energize said first timing means and to energize said first solenoid to effect turning of said hopper for a predetermined period of time, means including said first and said second valve means to return said hopper and said pattern box to their initial positions, a second timing means, means actuable by said pattern box as it returns to its initial position to energize said second timing means and to energize said third solenoid to effect movement of said oven from a retracted position to a position over said pattern box, and means to return said oven to its retracted position at the end of a predetermined period of time and including said third valve means and said second timing means.

24. A shell molding machine comprising a hopper, a first power means connected to said hopper to rotate said hopper, a first valve means including a first solenoid connected to said first power means, a pattern box, a second power means connected to said pattern box to rotate said pattern box, a second valve means including a second solenoid connected to said second power means, a first circuit means connected to said first and to said second solenoid and connectable to a source of power to energize said solenoids, an oven movable over said pattern box, a third power means connected to said oven to move said oven, a third valve means including a third solenoid connected to said third power means, a second circuit connected to said third solenoid and connectable to a source of power to energize said third solenoid, and means in said first circuit and in said second circuit operable to interrupt said second circuit when said first circuit is energized, and to interrupt said first circuit when said second circuit is energized.

25. A shell molding machine comprising a hopper, a pattern box mounted swingably on said hopper, means to swing said pattern box to close the mouth of said hopper, a louvre on said hopper comprising a plurality of blades swingable on an axis of said hopper, each of said blades being mounted on an axle disposed to one side of the center line of the blade to thereby afford a short torque arm and a longer torque arm extending from said axle, the axles being spaced so that the longer torque arm of one blade underlies the shorter torque arm of an adjacent blade when the louvre is closed, means to invert said hopper and said pattern box thereon, and means actuable in timed relation to movement of said hopper to open said louvre when said hopper becomes inverted.

26. In a shell molding machine, a pattern box, a stripper plate in said pattern box, flexible chain-like means connected to said stripper plate and extending through openings in the bottom of said pattern box, external spring means below said pattern box and connected at one end to said chain-like means and anchored at the other end to the bottom of said pattern box.

27. In a shell molding machine, a pattern box, a stripper plate in said pattern box, means adjustably positioning said stripper plate above the bottom of said pattern box, flexible chain-like means connected to s aid stripper plate and extending through openings in the bottom of said pattern box, external spring means below said pattern box and connected at one end to said chain-like means and anchored at the other end to the bottom of said pattern box.

28. In a shell molding machine, a frame, a hopper mounted rotatably on said frame, a pattern box mounted on said hopper for swinging movement thereon, a stripper plate in said pattern box, locking means on said pattern box to lock said stripper plate to said pattern box, means on said frame holding said locking means in unlocked relation in one position of said pattern box and adapted to release said locking means for movement to locking relation upon swinging movement of said pattern box.

(References on following page)

References Cited in the file of this patent

UNITED STATES PATENTS

| | | |
|---|---|---|
| 2,659,944 | Valyi | Nov. 24, 1953 |
| 2,691,195 | Daugirdas | Oct. 12, 1954 |
| 2,695,431 | Davis | Nov. 30, 1954 |

FOREIGN PATENTS

| | | |
|---|---|---|
| 832,936 | Germany | Mar. 3, 1952 |

OTHER REFERENCES

The Iron Age, June 26, 1952, pages 112–116.
Foundry, November 1952, page 265.
Am. Foundryman, August 1952, pages 42–46.